(12) United States Patent
Venugopal et al.

(10) Patent No.: US 11,121,758 B2
(45) Date of Patent: Sep. 14, 2021

(54) LINK RECOVERY PROCEDURE ENHANCEMENTS

(71) Applicant: QUALCOMM Incorporated, San Diego, CA (US)

(72) Inventors: Kiran Venugopal, Raritan, NJ (US); Jung Ho Ryu, Fort Lee, NJ (US); Makesh Pravin John Wilson, San Diego, CA (US); Tao Luo, San Diego, CA (US); Tianyang Bai, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 16/737,697

(22) Filed: Jan. 8, 2020

(65) Prior Publication Data

US 2020/0228184 A1 Jul. 16, 2020

Related U.S. Application Data

(60) Provisional application No. 62/790,972, filed on Jan. 10, 2019.

(51) Int. Cl.
| | |
|---|---|
| *H04B 7/06* | (2006.01) |
| *H04W 76/00* | (2018.01) |
| *H04W 74/08* | (2009.01) |
| *H04W 72/04* | (2009.01) |
| *H04L 5/00* | (2006.01) |
| *H04W 76/11* | (2018.01) |
| *H04W 24/10* | (2009.01) |
| *H04W 72/14* | (2009.01) |
| *H04W 80/02* | (2009.01) |

(52) U.S. Cl.
CPC ......... *H04B 7/0695* (2013.01); *H04L 5/0051* (2013.01); *H04W 24/10* (2013.01); *H04W 72/046* (2013.01); *H04W 72/0413* (2013.01); *H04W 72/14* (2013.01); *H04W 74/0833* (2013.01); *H04W 76/11* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 2019/0306924 | A1* | 10/2019 | Zhang | H04W 72/046 |
| 2020/0404638 | A1* | 12/2020 | Deogun | H04L 5/0091 |
| 2020/0413469 | A1* | 12/2020 | Wu | H04W 76/19 |
| 2021/0058130 | A1* | 2/2021 | Zhu | H04W 72/046 |
| 2021/0068162 | A1* | 3/2021 | Agiwal | H04W 56/001 |

* cited by examiner

*Primary Examiner* — Scott M Sciacca
(74) *Attorney, Agent, or Firm* — Patterson + Sheridan, L.L.P.

(57) ABSTRACT

Certain aspects of the present disclosure provide techniques and apparatus for radio link recovery procedure enhancements in wireless communication systems. In some cases, radio link recovery may be enhanced (e.g., sped up and network congestion reduced) by allowing a user equipment (UE) to use an additional secondary cell (SCell) serving the UE to assist in beam recovery when a layer one (L1) event is detected on a primary cell (PCell) or primary secondary cell (PSCell) of the UE.

30 Claims, 11 Drawing Sheets

LINK RECOVERY PROCEDURE ENHANCEMENTS

CLAIM OF PRIORITY UNDER 35 U.S.C. § 119

This application claims benefit of U.S. Provisional Patent Application Ser. No. 62/790,972, filed Jan. 10, 2019, which is herein incorporated by reference in its entirety.

FIELD OF THE DISCLOSURE

Aspects of the present disclosure relate to wireless communications systems, and, more particularly, to techniques for link recovery procedures.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication that may be performed, for example, by a user equipment (UE). The method generally includes detecting a layer one (L1) event associated with at least one of a primary cell (PCell) serving the UE or a primary secondary cell (PSCell) serving the UE; triggering, in response to detecting the L1 event, a beam recovery procedure for at least one of the PCell or the PSCell, wherein triggering the beam recovery procedure includes transmitting a reconfiguration request via an additional secondary cell (SCell) to reconfigure at least one beam for at least one of the PCell or the PSCell; receiving request information via the additional SCell requesting identification information of the at least one beam to reconfigure; transmitting the requested identification information of the at least one beam; receiving, in response to transmitting the requested identification information, reconfiguration information for the at least one beam; and communicating, based on the reconfiguration information, with at least one of the PCell or the PSCell using the at least one beam.

Certain aspects of the present disclosure provide an apparatus for wireless communications by a user equipment (UE). The apparatus generally includes at least one processor configured to detect a layer one (L1) event associated with at least one of a primary cell (PCell) serving the UE or a primary secondary cell (PSCell) serving the UE; trigger, in response to detecting the L1 event, a beam recovery procedure for at least one of the PCell or the PSCell, wherein triggering the beam recovery procedure includes transmitting a reconfiguration request via an additional secondary cell (SCell) to reconfigure at least one beam for at least one of the PCell or the PSCell; receive request information via the additional SCell requesting identification information of the at least one beam to reconfigure; transmit the requested identification information of the at least one beam; receive, in response to transmitting the requested identification information, reconfiguration information for the at least one beam; and communicate, based on the reconfiguration information, with at least one of the PCell or the PSCell using the at least one beam. The apparatus also generally includes a memory coupled with the at least one processor.

Certain aspects of the present disclosure provide an apparatus for wireless communications by a user equipment (UE). The apparatus generally includes means for detecting a layer one (L1) event associated with at least one of a primary cell (PCell) serving the UE or a primary secondary cell (PSCell) serving the UE; means for triggering, in response to detecting the L1 event, a beam recovery procedure for at least one of the PCell or the PSCell, wherein triggering the beam recovery procedure includes transmitting a reconfiguration request via an additional secondary cell (SCell) to reconfigure at least one beam for at least one of the PCell or the PSCell; means for receiving request information via the additional SCell requesting identification information of the at least one beam to reconfigure; means for transmitting the requested identification information of the at least one beam; means for receiving, in response to transmitting the requested identification information, reconfiguration information for the at least one beam; and means for communicating, based on the reconfiguration information, with at least one of the PCell or the PSCell using the at least one beam.

Certain aspects of the present disclosure provide a non-transitory computer-readable medium for wireless communications by a user equipment (UE). The non-transitory computer-readable medium generally includes instructions that, when executed by at least one processor, configure the at least one processor to detect a layer one (L1) event associated with at least one of a primary cell (PCell) serving the UE or a primary secondary cell (PSCell) serving the UE; trigger, in response to detecting the L1 event, a beam recovery procedure for at least one of the PCell or the PSCell, wherein triggering the beam recovery procedure includes transmitting a reconfiguration request via an additional secondary cell (SCell) to reconfigure at least one beam for at least one of the PCell or the PSCell; receive request information via the additional SCell requesting identification information of the at least one beam to reconfigure; transmit the requested identification information of the at least one beam; receive, in response to transmitting the requested identification information, reconfiguration information for the at least one beam; and communicate, based on the reconfiguration information, with at least one of the PCell or the PSCell using the at least one beam.

Certain aspects of the present disclosure provide a method for wireless communication that may be performed, for example, by a user equipment (UE). The method generally includes receiving, from a user equipment (UE) served by at least one of a primary cell (PCell) and or a primary secondary cell (PSCell), a reconfiguration request to reconfigure at least one beam for at least one of the PCell or the PSCell in response to a layer one (L1) event at the UE associated with at least one of the PCell or the PSCell, wherein the reconfiguration request is received via an additional secondary cell (SCell) serving the UE; transmitting, to the UE, request information requesting identification information of the at least one beam to reconfigure; receiving, from the UE, the requested identification information of the at least one beam; and transmitting, in response to receiving the requested identification information, reconfiguration information for the at least one beam.

Certain aspects of the present disclosure provide an apparatus for wireless communications by a user equipment (UE). The apparatus generally includes at least one processor configured to receive, from a user equipment (UE) served by at least one of a primary cell (PCell) and or a primary secondary cell (PSCell), a reconfiguration request to reconfigure at least one beam for at least one of the PCell or the PSCell in response to a layer one (L1) event at the UE associated with at least one of the PCell or the PSCell, wherein the reconfiguration request is received via an additional secondary cell (SCell) serving the UE; transmit, to the UE, request information requesting identification information of the at least one beam to reconfigure; receive, from the UE, the requested identification information of the at least one beam; and transmit, in response to receiving the requested identification information, reconfiguration information for the at least one beam. The apparatus also generally includes a memory coupled with the at least one processor.

Certain aspects of the present disclosure provide an apparatus for wireless communications by a user equipment (UE). The apparatus generally includes means for receiving, from a user equipment (UE) served by at least one of a primary cell (PCell) and or a primary secondary cell (PSCell), a reconfiguration request to reconfigure at least one beam for at least one of the PCell or the PSCell in response to a layer one (L1) event at the UE associated with at least one of the PCell or the PSCell, wherein the reconfiguration request is received via an additional secondary cell (SCell) serving the UE; means for transmitting, to the UE, request information requesting identification information of the at least one beam to reconfigure; means for receiving, from the UE, the requested identification information of the at least one beam; and means for transmitting, in response to receiving the requested identification information, reconfiguration information for the at least one beam.

Certain aspects of the present disclosure provide a non-transitory computer-readable medium for wireless communications by a user equipment (UE). The non-transitory computer-readable medium generally includes instructions that, when executed by at least one processor, configure the at least one processor to receive, from a user equipment (UE) served by at least one of a primary cell (PCell) and or a primary secondary cell (PSCell), a reconfiguration request to reconfigure at least one beam for at least one of the PCell or the PSCell in response to a layer one (L1) event at the UE associated with at least one of the PCell or the PSCell, wherein the reconfiguration request is received via an additional secondary cell (SCell) serving the UE; transmit, to the UE, request information requesting identification information of the at least one beam to reconfigure; receive, from the UE, the requested identification information of the at least one beam; and transmit, in response to receiving the requested identification information, reconfiguration information for the at least one beam.

Aspects include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example telecommunications system, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques and apparatus for radio link recovery procedure enhancements. In some cases, radio link recovery may be enhanced (e.g., sped up and network congestion reduced) by allowing a user equipment (UE) to use an additional secondary cell (SCell) serving the UE to assist in beam recovery when a layer one (L1) event is detected on a primary cell (PCell) or primary secondary cell (PSCell) of the UE.

The following description provides examples of radio link recovery procedure enhancements, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
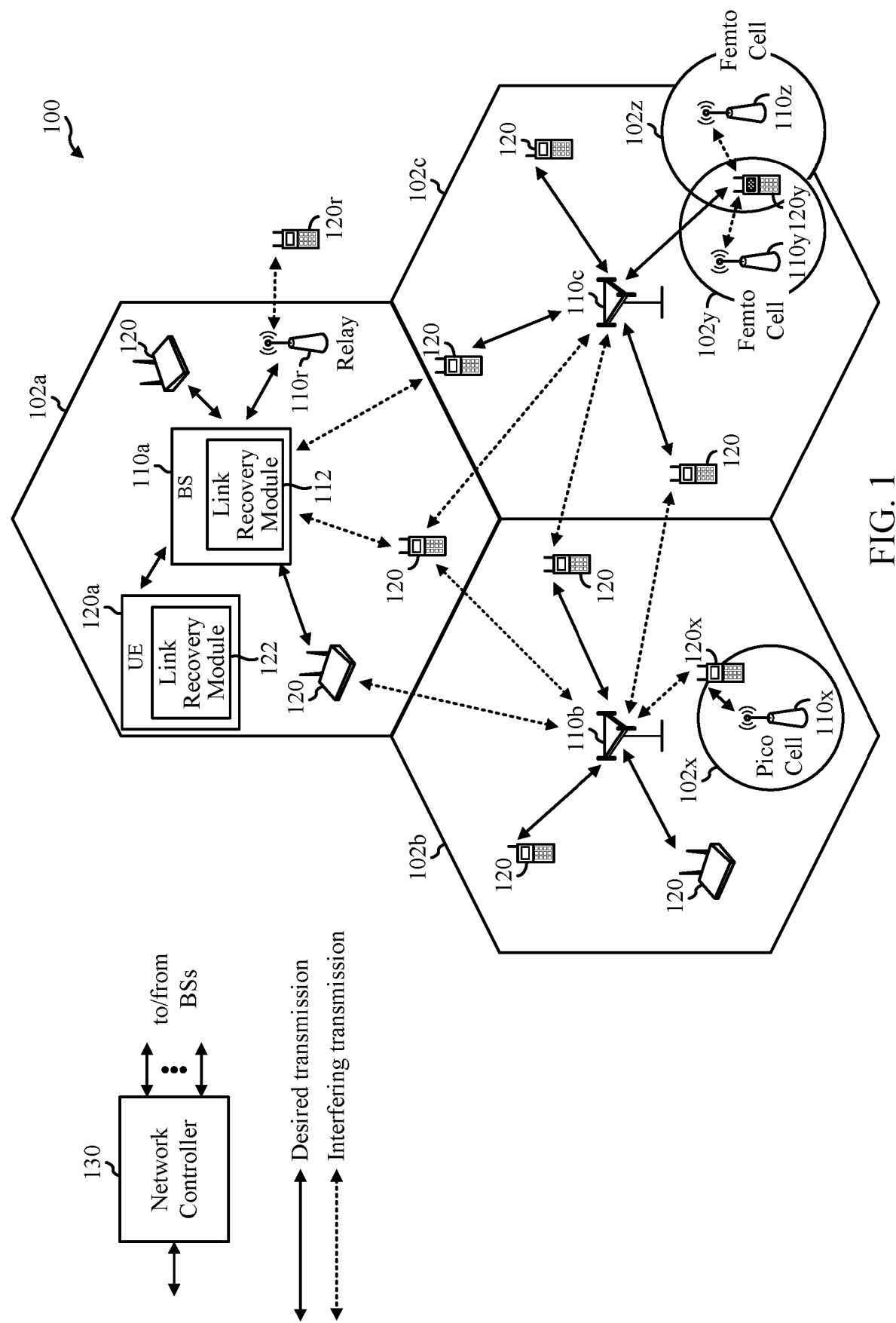

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for mobility-aware access control as described herein. As shown in FIG. 1, the BS 110a includes a link recovery module 112. The link recovery module 112 may be configured to perform the operations illustrated in one or more of FIGS. 8 and 9 for link recovery procedure enhancements, in accordance with aspects of the present disclosure. Additionally, as shown in FIG. 1, the UE 120a includes a link recovery module 122. The link recovery module 122 may be configured to perform the operations illustrated in one or more of FIGS. 7 and 9 for link recovery procedure enhancements, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
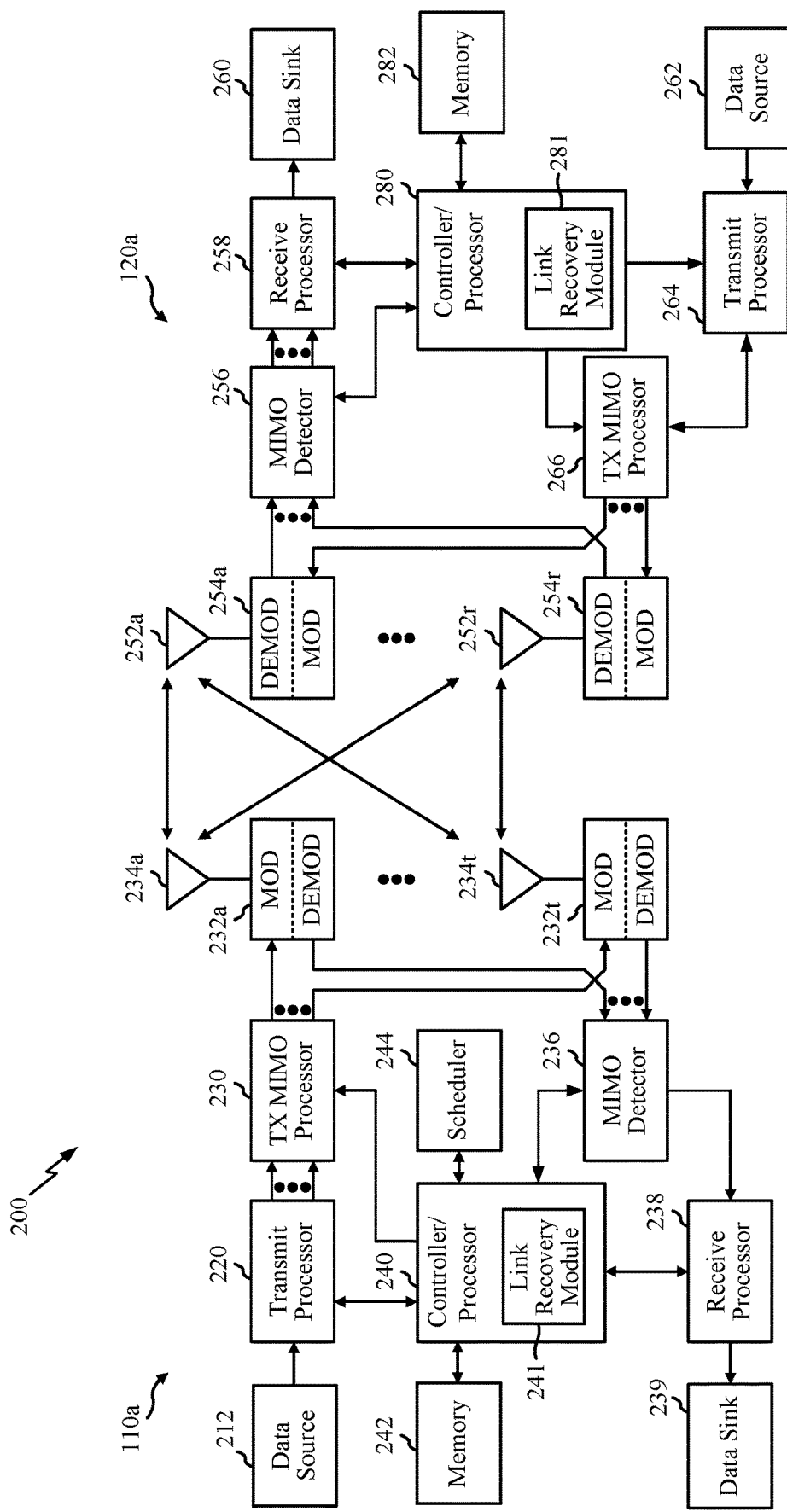
FIG. 2 is a block diagram conceptually illustrating a design of an example BS and UE, in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. For example, as shown in FIG. 2, the controller/processor 240 of the BS 110*a* includes an link recovery module 241 that may be configured to perform the operations illustrated in one or more of FIGS. 8 and 9 for link recovery procedure enhancements, according to aspects described herein. As shown in FIG. 2, the controller/processor 280 of the UE 120*a* includes link recovery module 281 that may be configured to perform the operations illustrated in one or more of FIGS. 7 and 9 for link recovery procedure enhancements, according to aspects described herein. Although shown at the Controller/Processor, other components of the UE 120*a* and BS 110*a* may be used performing the operations described herein.

Example Link Recovery Procedure

Certain wireless communication standards use beamformed transmissions, wherein active beams are used to transmit and receive control and data. In some cases, active beams used for communication by a nodeB (NB) and a UE may suffer over time and may become unusable, resulting in a beam failure. To address this beam failure (and other layer one (L1) events discussed below), the UE may perform a beam failure recovery procedure.

A beam failure recovery procedure (e.g., performed by a UE and/or a network entity) can identify link issues and provide aperiodic in-synchronization (in-sync, IS) and aperiodic out-of-synchronization (out-of-sync, OOS) indications to higher layers (e.g., higher layers of a wireless communications protocol stack of the UE. For this purpose, a network entity (e.g., an access node, a cell, or a next generation NodeB (gNB)) may configure beam failure recovery reference signal (BFR-RS) resource(s) at a UE. The BFR-RS resources may include resources configured for detection and resources configured for recovery.

In some cases, the beam failure recovery procedure may identify issues with an active control beam (e.g., used for conveying PDCCH or PUCCH) based on measurements of one or more downlink (DL) reference signals (e.g., BFR-RS associated with the BFR-RS resources mentioned above).

In some cases, a beam failure recovery procedure may also maintain a set of candidate beams. That is, a beam failure recovery procedure can include processes to determine a set of candidate beams, inform a wireless communications device (e.g., a UE or a BS) of the candidate beams, and update the wireless communications device when candidate beams are updated (e.g., in the event of a change in channel conditions). One or more candidate beams can be used to send a beam failure recovery request, if a UE or network entity determines that a beam failure has occurred.

Additionally, in some cases, a radio link monitoring procedure can identify link issues and provide periodic in-sync and out-of-sync indications to higher layers of the UE. For this purpose, a network entity may configure X radio link monitoring reference signal (RLM-RS) resource(s) at a UE.

Figure 3:
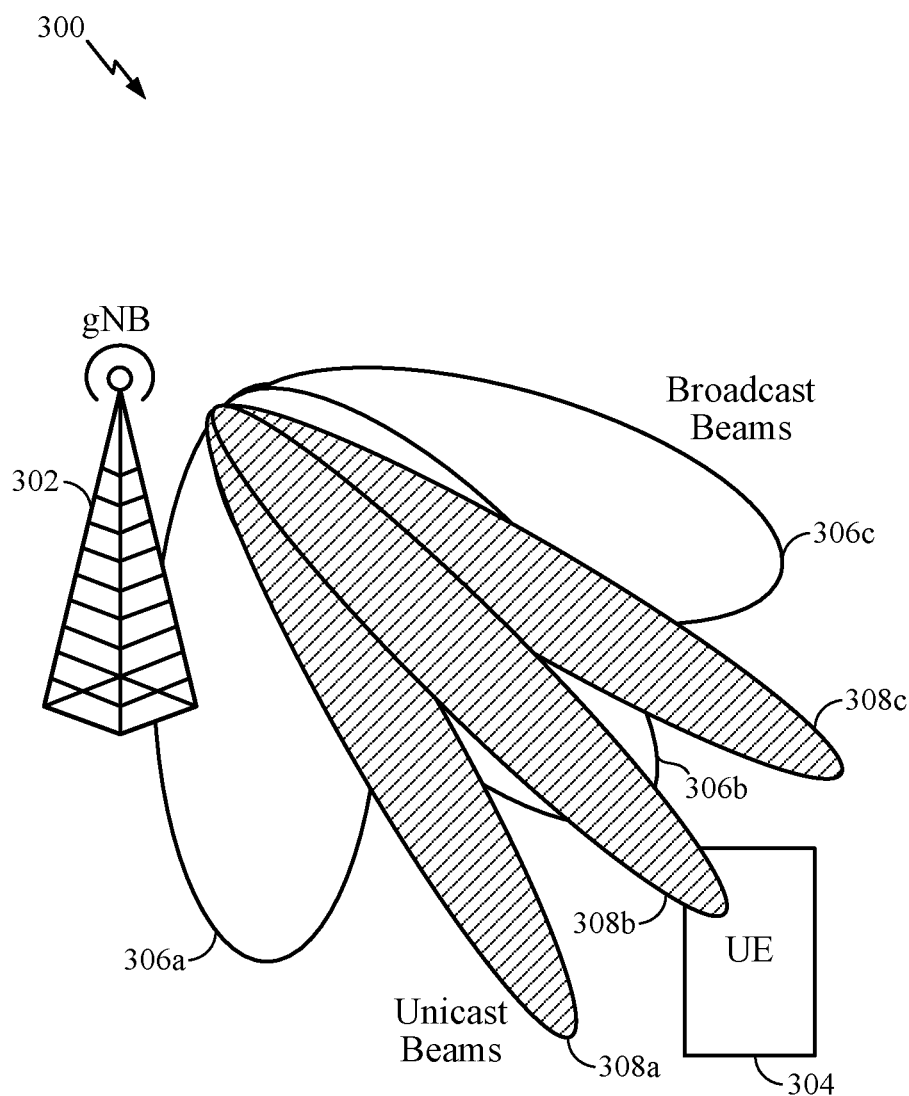
FIG. 3 illustrates example beamformed communication including broadcast beams and unicast beams.

FIG. 3 illustrates an example 300 of beamformed communication including broadcast beams 306a, 306b, and 306c and unicast beams 308a, 308b, and 308c. While the example shows three broadcast beams and three unicast beams, the present disclosure is not so limited, and aspects of the present disclosure may be used in systems using more or fewer broadcast beams and more or fewer unicast beams. The broadcast beams 306a, 306b, and 306c may, for example, be used for transmitting channels via a common search space of the UE while the unicast beams 308a, 308b, and 308c may be used for transmitting channels via a UE-specific search space of the UE. ABS (e.g., a gNB) 302 communicates with a UE 304 using active beams. The BS may transmit some signals using the broadcast beams and other signals using the unicast beams. In one example, the broadcast beams may include broadcast transmissions (e.g., transmissions intended for more than one UE). The unicast beams may include unicast transmissions (e.g., transmission intended for a specific UE). Unicast beams may have better coverage as compared to broadcast beams, for example, due to beam management and refinement procedures for unicast beams. As illustrated in FIG. 3, the broadcast beams 306a, 306b, and 306c may be wider than the unicast beams 308a, 308b, and 308c. Additionally, the broadcast beams 306a, 306b, and 306c may not reach as far as the narrower, unicast beams 308a, 308b, and 308c.

According to one example, information transmitted in the broadcast beams 306a, 306b, and 306c may include a physical downlink control channel (PDCCH) and a physical downlink shared channel (PDSCH) used for carrying remaining minimum system information (RMSI). RMSI may include information similar to System Information Block-1 (SIB1) and SIB-2 in LTE. RMSI may be carried via PDSCHs and PDCCHs (e.g., which may provide grants for the PDSCHs). In mmW systems, RMSI may be beam swept, similar to a Master Information Block (MIB) in LTE. According to an example, RMSI may not be transmitted in the unicast beams in some cases.

As noted above, a UE entering the system may receive information via beams transmitted in the broadcast beams 306a, 306b, or 306c. Accordingly, the UE may receive RMSI via broadcast beams 306a, 306b, or 306c. After obtaining system information, the UE may be served using dedicated beams, such as the unicast beams 308a, 308b, or 308c.

The UE may perform a radio link monitoring (RLM) procedure to monitor a link quality of the dedicated beams to ensure the UE continues to be able to communicate using these dedicated beams. In some cases, the detection of an issue by the RLM procedure by a device (e.g., a UE) may lead the device to begin a radio link failure (RLF) procedure. A relationship between an RLM procedure and an RLF procedure (e.g., an LTE RLF procedure) for a primary cell (PCell) and a primary secondary cell (PSCell) is described in the table 1 and table 2 below. As shown in the table 1 below, an RLF procedure of a device may use two timers, referred to as T310 and T313, in determining whether to report a serving cell group (SCG) failure (e.g., an RLF for the SCG). The RLF procedure may also refer to constants (e.g., N310, N311, N313, and N314), which may be configured or reconfigured based on network standards or configurations received from the network, in determining whether to start or stop the various timers.

TABLE 1

RLF Timers

| Timer | Start condition(s) | Stop condition(s) | Action(s) to perform at expiry of timer |
|---|---|---|---|
| T310 | Upon detecting physical layer problems for the PCell, i.e., upon receiving N310 (i.e., a first threshold number) consecutive out-of-sync indications from lower layers | (1) Upon receiving N311 (i.e., a second threshold number) consecutive in-sync indications from lower layers for the Pcell, (2) upon triggering the handover procedure, or (3) upon initiating the connection reestablishment procedure. | If security is not activated: go to a radio resource control idle state (RRC_IDLE); otherwise, initiate a connection reestablishment procedure. |
| T313 | Upon detecting physical layer problems for the PSCell, i.e., upon receiving N313 (i.e., a third threshold number) consecutive out-of-sync indications from lower layers | (1) Upon receiving N314 (i.e., a fourth threshold number) consecutive in-sync indications from lower layers for the PSCell, (2) upon initiating the connection reestablishment procedure, (3) upon SCG release, or (4) upon receiving a radio resource control connection reconfiguration message (RRCConnectionReconfiguration) including a mobility control information secondary cell group (MobilityControlInfoSCG) information element (IE) | Inform E-UTRAN about the SCG radio link failure by initiating the SCG failure information procedure. |

TABLE 2

RLF Constants

| Constant | Usage |
|---|---|
| N310 | Maximum number of consecutive "out-of-sync" indications for the PCell received from lower layers before starting T310 timer for an RLF procedure for the PCell |
| N311 | Minimum number of consecutive "in-sync" indications for the PCell received from lower layers before stopping and resetting T310 timer |
| N313 | Maximum number of consecutive "out-of-sync" indications for the PSCell received from lower layers before starting T311 timer for and RLF procedure for the PSCell |
| N314 | Minimum number of consecutive "in-sync" indications for the PSCell received from lower layers before stopping and resetting the T311 timer |

In some cases, RLM-RS resource(s) and BFR-RS resource(s) for a UE may be configured with different sets of broadcast beams and/or unicast beams that can cause one or more issues as described below.

For example, a UE may monitor an RLM-RS resource set to determine whether to send periodic OOS indications. If the RLM-RS resource set does not contain BFR-RS resource(s), then the physical layer (i.e., layer one (L1)) of the protocol stack of the UE may send periodic OOS indications to higher layers, even though the link quality metric based on BFR-RS resource(s) is good. For example, UE 304 (see FIG. 3) may be configured with RLM-RS resources that are included in the broadcast beams 306a, 306b, or 306c configured via NR-SS or CSI-RS. In the example, the UE may also be configured with BFR-RS resources that are included in the unicast beams configured using NR-SS or CSI-RS. Still in the example, L1 of the UE may send periodic OOS indications to higher layers even though the link quality metric based on the BFR-RS resource set is good.

In some cases, a UE may monitor an RLM-RS resource set to send periodic IS indications. The UE may also be configured with one or more candidate RS resources (e.g., beam pairs) for reporting a beam failure, if the UE detects a beam failure. If the RLM-RS resource set does not contain a candidate RS resource(s) (i.e., BFR candidate RS resources), then L1 may not send periodic IS indications to higher layers even though the link quality metric based on BFR candidate RS resource(s) is good. For example, UE 304 (see FIG. 3) may be configured with RLM-RS resources that are included in the broadcast beams 306a, 306b, or 306c configured via NR-SS or CSI-RS. In the example, the UE may also be configured with BFR-RS resources that are included in the unicast beams configured using NR-SS or CSI-RS. Still in the example, the UE may experience a deterioration of channel conditions, and L1 of the UE begins sending periodic OOS indications to higher layers. In the example, the UE channel conditions may then improve, such that the link quality metric based on the BFR-RS resource set is good. Still in the example, L1 of the UE may not begin sending in-sync indications because the RLM-RS resources that the UE uses in determining whether to send the in-sync indications do not include the BFR-RS resource set. In the example, the UE may declare an RLF because L1 of the UE does not start sending the in-sync indications.

Figure 4:
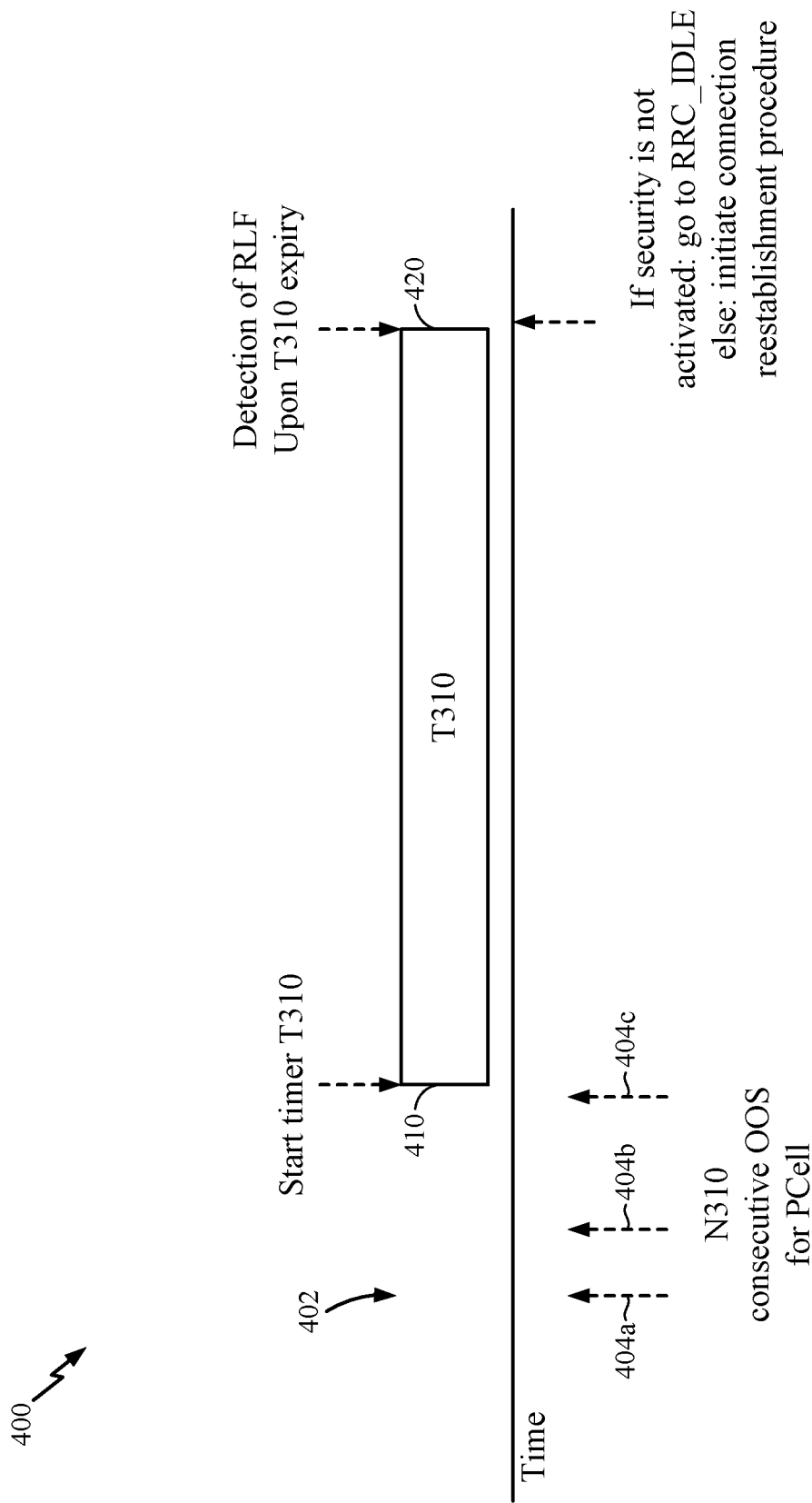
FIG. 4 illustrates an exemplary timeline for detection of physical layer problems in accordance with aspects of the present disclosure.

FIG. 4 illustrates an exemplary timeline 400 for detection of physical layer problems (e.g., misalignment of a transmit beam and a receive beam of an active beam pair), in accordance with aspects of the present disclosure. As shown at 402, a UE (e.g., UE 120 shown in FIG. 1 or UE 304 shown in FIG. 3) may begin counting OOS indications 404a, 404b, and 404c obtained from L1. Upon counting N310 (e.g., three) consecutive OOS indications for the PCell, the UE may start the timer T310, as shown at 410. At 420, the T310 timer expires, and the UE either transitions to a radio resource connection idle state (RRC_IDLE), if security is not activated, or the UE initiates a connection reestablishment procedure.

Figure 5:
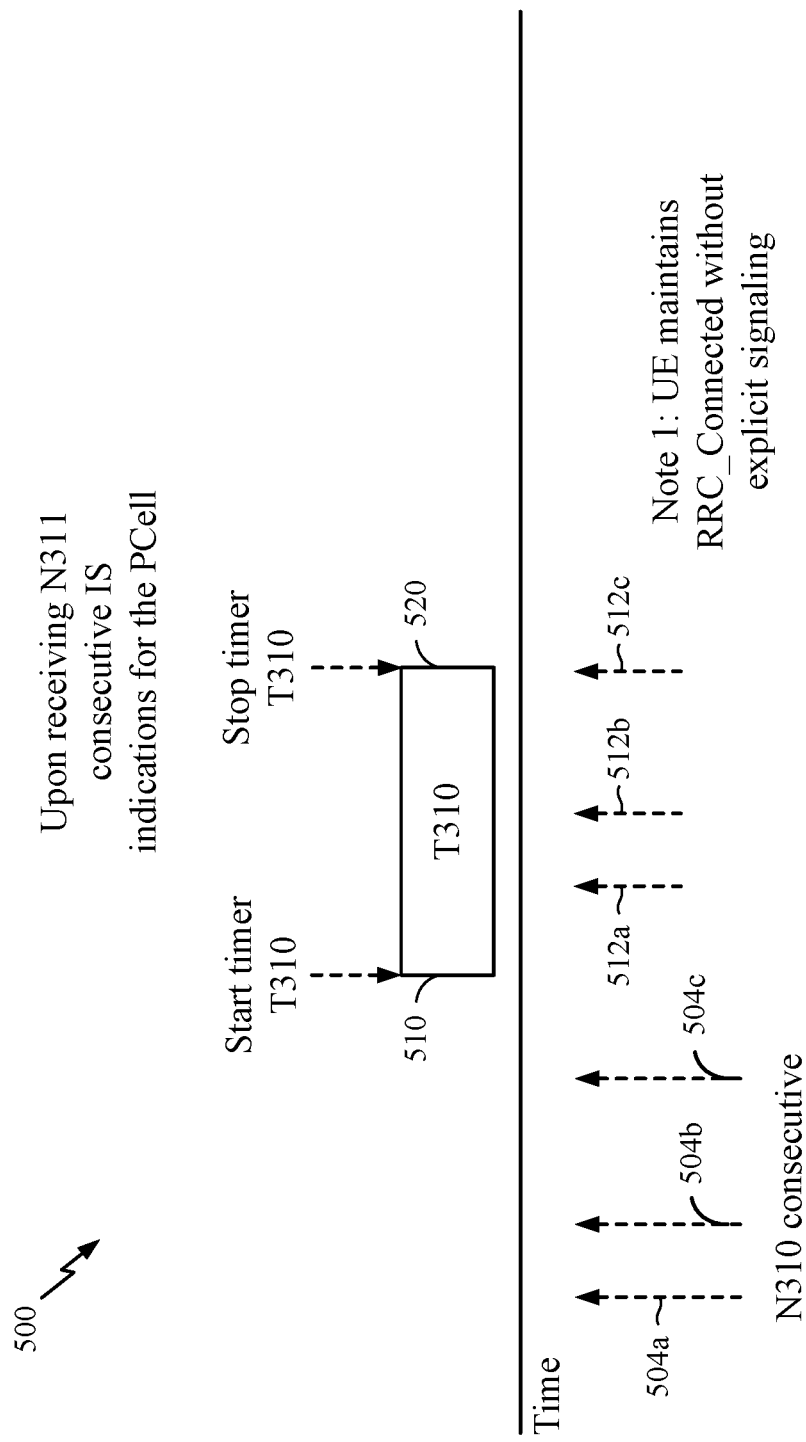
FIG. 5 illustrates an exemplary timeline for recovery from physical layer problems in accordance with aspects of the present disclosure.

FIG. 5 illustrates an exemplary timeline 500 for recovery from physical layer problems (e.g., misalignment of a transmit beam and a receive beam of an active beam pair), in accordance with aspects of the present disclosure. As in FIG. 4, a UE (e.g., UE 120 shown in FIG. 1 or UE 304 shown in FIG. 3) may start the timer T310 at 510, upon counting N310 consecutive OOS indications 504a, 504b, and 504c for the PCell. While T310 is running, channel conditions improve and the UE counts consecutive in-sync indications 512a, 512b, and 512c. At 520, the UE has counted N311 (e.g., three) consecutive in-sync indications and stops the T310 timer (i.e., before the T310 timer expires). As illustrated, the UE can remain in an RRC connected state (e.g., RRC Connected) with no other explicit signaling.

Example Link Recovery Procedure Enhancements

As noted above, in certain wireless communication networks, UEs may communicate with the network using one or more transmission beams. The UE may monitor the quality of the one or more transmission beams to ensure the UE is continuously capable of communication using the one or more transmission beams. In some cases, during monitoring (e.g., RLM) of the one or more transmission beams, if the UE determines that a layer one (L1) event associated with the one or more transmission beams occurs (e.g., a beam failure due to a quality of the one or more transmission beams falling below a certain threshold), a beam recovery procedure may be triggered at the UE. As explained in greater detail below, a beam recovery procedure may involve the UE signaling to a gNB of the network to reconfigure the one or more transmission beams for communication.

Figure 6:
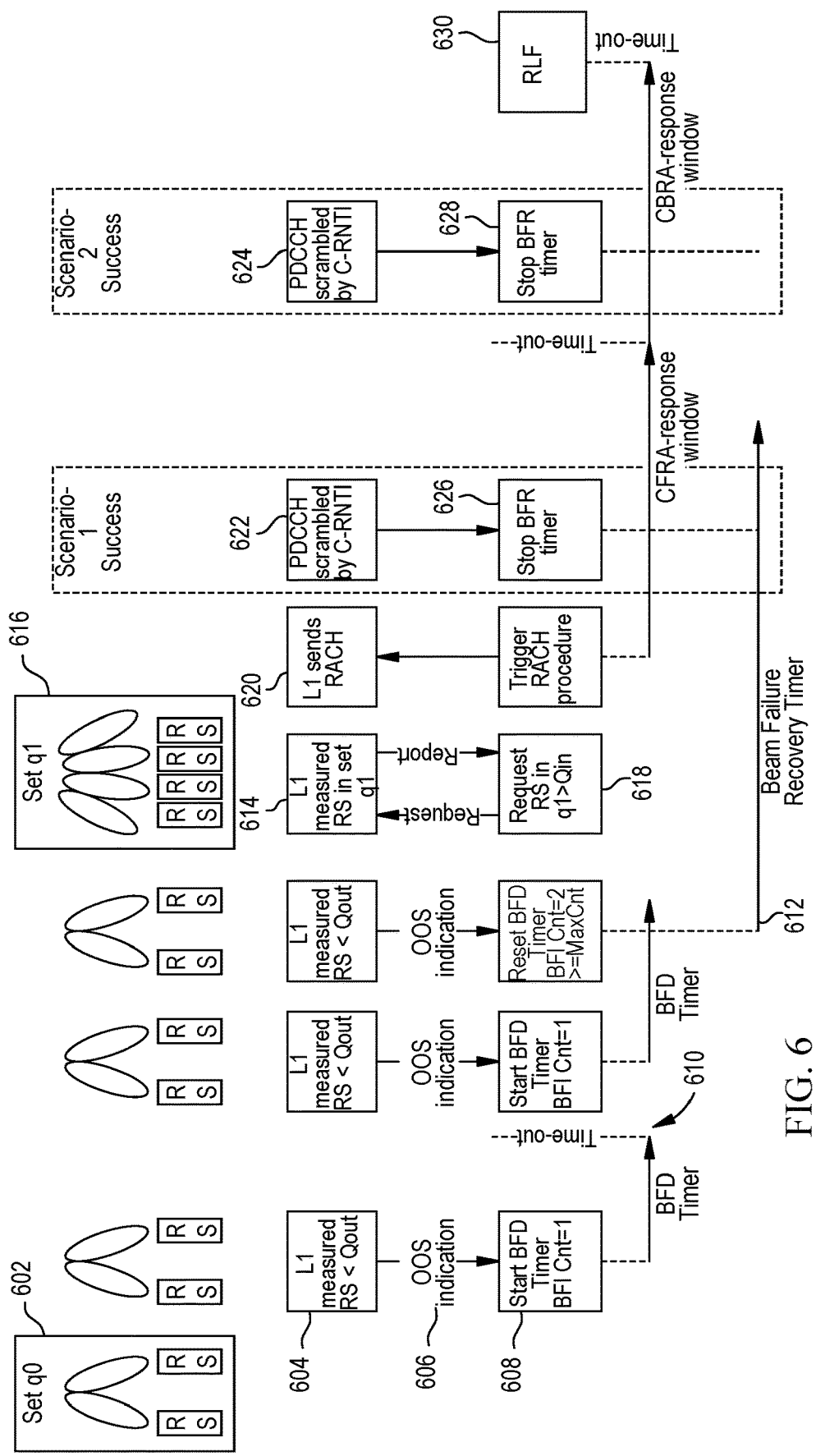
FIG. 6 illustrates an example link recovery procedure, in accordance with aspects of the present disclosure.

FIG. 6 illustrates an example beam recovery procedure, according to certain aspects of the present disclosure. For example, as illustrated, a gNB may configure a UE (e.g., through RLC) with a set of one or more beams, known as a beam failure detection set (e.g., set q0 at 602 in FIG. 6). The gNB may periodically transmit on the beams in set q0 (e.g., two beams as illustrated in FIG. 6), which may be monitored by the UE. In some cases, while monitoring the beams of set q0, if the UE detects that both beams fail to meet certain conditions (e.g., in some cases the RSRP, SINR, SNR, or a combination of these measurements is below a certain threshold (e.g., gout)) as illustrated at 604, an out of sync (OOS) indication is transmitted from layer 1 to higher layers in the UE at 606, indicating that the beams in set q0 have failed. In response to the OOS indication, the UE may start a counter (e.g., BFI counter) and a timer (e.g., BFD timer) at 608. According to aspects, if the counter reaches a maximum count (e.g., the UE receives a maximum number of OOS indications) before the timer expires, as illustrated at 610, an "L1 event" (e.g., beam failure has occurred) is said to be triggered and the UE attempts a beam recovery procedure.

Thereafter, once the beam recovery procedure has been started, the UE starts a second timer (e.g., a beam failure recovery timer) at 612 and monitors 614 a second set of beams (e.g., set q1 616), known as a recovery candidate CORESET. According to aspects, if the UE determines at 618 that one or more beams of set q1 meet certain criteria (e.g., RSRP, SINR, SNR, or a combination of these measurements is above a threshold), the UE may send a RACH on the one or more beams of set q1 that meet the criteria at 620 and wait for a response from the gNB. In some cases, if the UE receives a response from the gNB, the response may include a PDCCH scrambled by C-RNTI, as illustrated at 622 and 624 of success scenarios 1 and 2, respectively. Thereafter, the UE may stop the second timer (e.g., the beam failure recovery timer), as illustrated at 626 and 628 of success scenarios 1 and 2, respectively. In some cases, if the UE does not receive a response from the gNB before the expiration of the second timer, the UE may declare a radio link failure (RLF), as illustrated at 630.

According to aspects, the link recovery procedure described above with respect to FIG. 6 may be defined for the primary cell (PCell) and primary secondary cell (PSCell)

of the UE. However, in operation, the UE may also communicate via additional secondary cells (SCells) (e.g., in addition to the PCell and PSCell of the UE). Thus, aspects of the present disclosure provide techniques for enhancing the link recovery procedure of a UE, for example, in some cases, by allowing the UE to use the additional SCell to assist in the link recovery procedure. In some cases, the techniques presented herein may allow faster link recovery should beams of a PCell and/or PSCell fail. Additionally, the techniques presented herein may reduce signaling congestion in the network compared to the case where the UE attempts contention based RACH for recovery using the PCell and/or PSCell.

Figure 7:
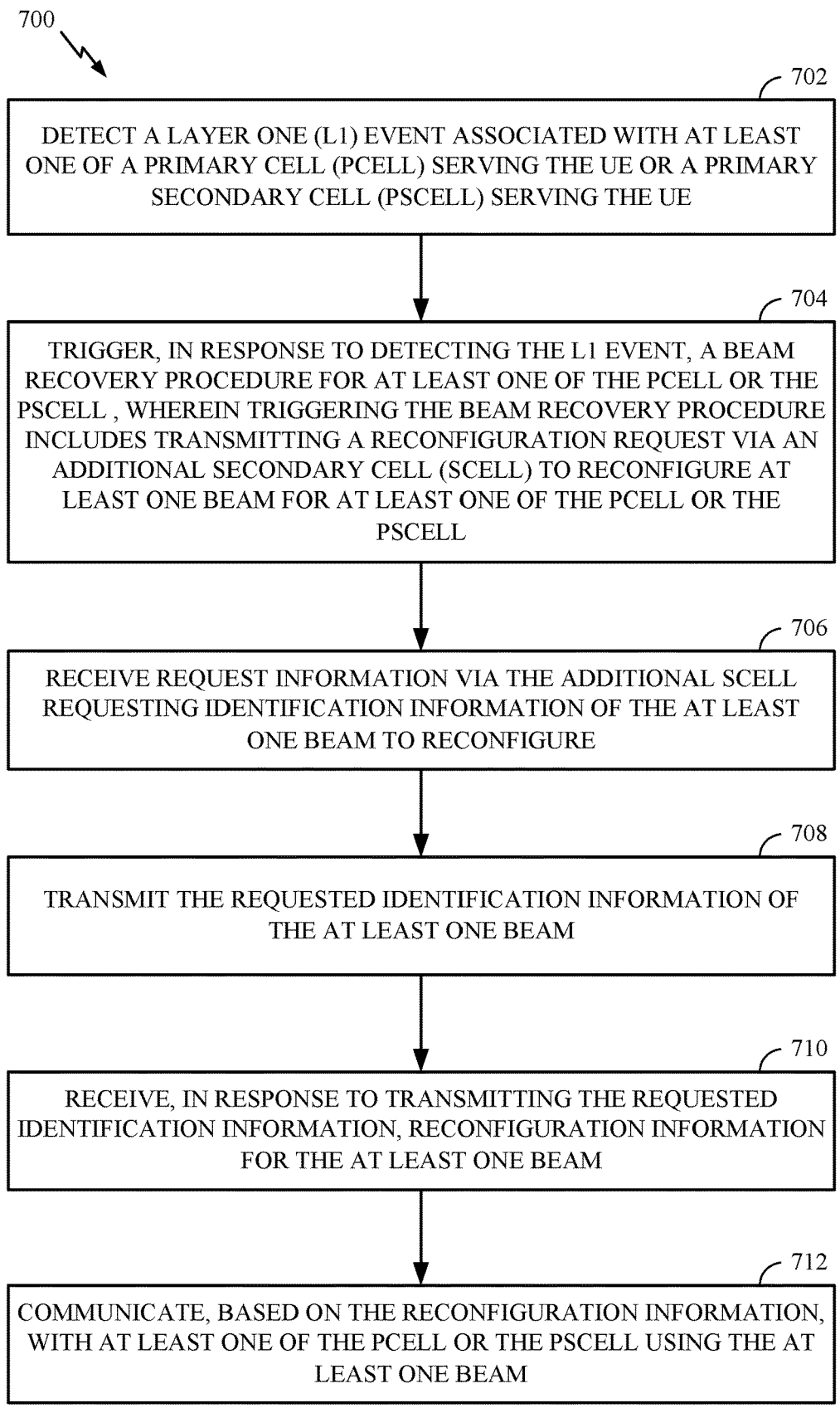
FIG. 7 illustrates example operations performed by a UE, in accordance with certain aspects of the present disclosure.

FIG. 7 illustrates example operations 700 which may be performed by a UE (e.g., UE 120, shown in FIG. 1, or UE 304, shown in FIG. 3), according to aspects of the present disclosure. In some cases, the UE may be configured with at least one of a primary cell (PCell) or a primary secondary cell (PSCell). Additionally, in some cases, the UE may also be configured with an additional secondary cell (SCell).

According to aspects, the UE may include one or more components as illustrated in FIG. 2 which may be configured to perform the operations described herein. For example, the antenna 252, transceiver 254, controller/processor 280, and/or memory 282 as illustrated in FIG. 2 may perform the operations described herein.

Operations 700 begin at 702 with the UE detecting a layer one (L1) event associated with at least one of a primary cell (PCell) serving the UE or a primary secondary cell (PSCell) serving the UE. In some cases, the L1 event may include a beam failure, a beam not currently being used by the UE for communication with the PCell or the PSCell becoming better (e.g., with respect to signal strength/quality) than a current beam used for communication with the PCell or the PSCell, or some subset of a monitored set of beams becoming poor (e.g., with respect to signal strength/quality), etc.

At 704, the UE triggers, in response to detecting the L1 event, a beam recovery procedure for at least one of the PCell or the PSCell, wherein triggering the beam recovery procedure includes transmitting a reconfiguration request via an additional secondary cell (SCell) to reconfigure at least one beam for at least one of the PCell or the PSCell.

At block 706, the UE receives request information via the additional SCell requesting identification information of the at least one beam to reconfigure.

At block 708, the UE transmits the requested identification information of the at least one beam.

At block 710, the UE receives, in response to transmitting the requested identification information, reconfiguration information for the at least one beam.

At block 712, the UE communicates, based on the reconfiguration information, via at least one of the PCell or the PSCell using the at least one beam.

Figure 8:
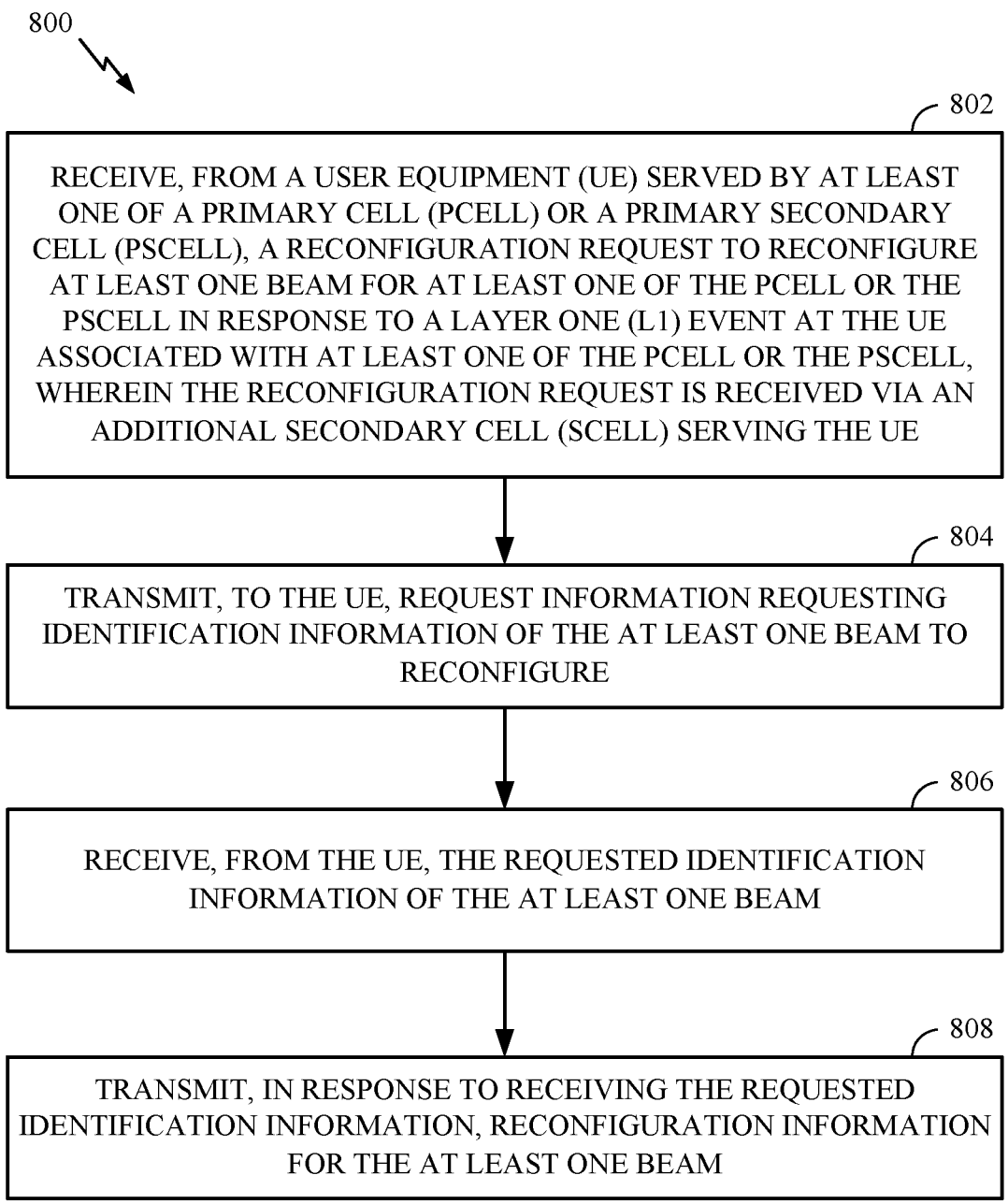
FIG. 8 illustrates example operations performed by a BS, in accordance with certain aspects of the present disclosure.

FIG. 8 illustrates example operations 800 which may be performed by a BS/gNB (e.g., BS 110, shown in FIG. 1, or BS 302, shown in FIG. 3), according to aspects of the present disclosure. Operations 800 may be considered complementary to operations 700, shown in FIG. 7.

According to aspects, the BS may include one or more components as illustrated in FIG. 2 which may be configured to perform the operations described herein. For example, the antenna 234, transceiver 232, controller/processor 240, and/or memory 242 as illustrated in FIG. 2 may perform the operations described herein.

At block 802, operations 800 begin with the BS receiving, from a user equipment (UE) served by at least one of a primary cell (PCell) or a primary secondary cell (PSCell), a reconfiguration request to reconfigure at least one beam for at least one of the PCell or the PSCell in response to a layer one (L1) event at the UE associated with at least one of the PCell or the PSCell, wherein the reconfiguration request is received via an additional secondary cell (SCell) serving the UE.

At block 804, the BS transmits, to the UE, request information requesting identification information of the at least one beam to reconfigure.

At block 806, the BS receives, from the UE, the requested identification information of the at least one beam.

At block 808, the BS transmits, in response to receiving the requested identification information, reconfiguration information for the at least one beam.

As noted above, aspects of the present disclosure provide techniques for enhancing the link recovery procedure of a UE, for example, in some cases, by allowing the UE to use an additional SCell to assist in the link recovery procedure.

Figure 9:
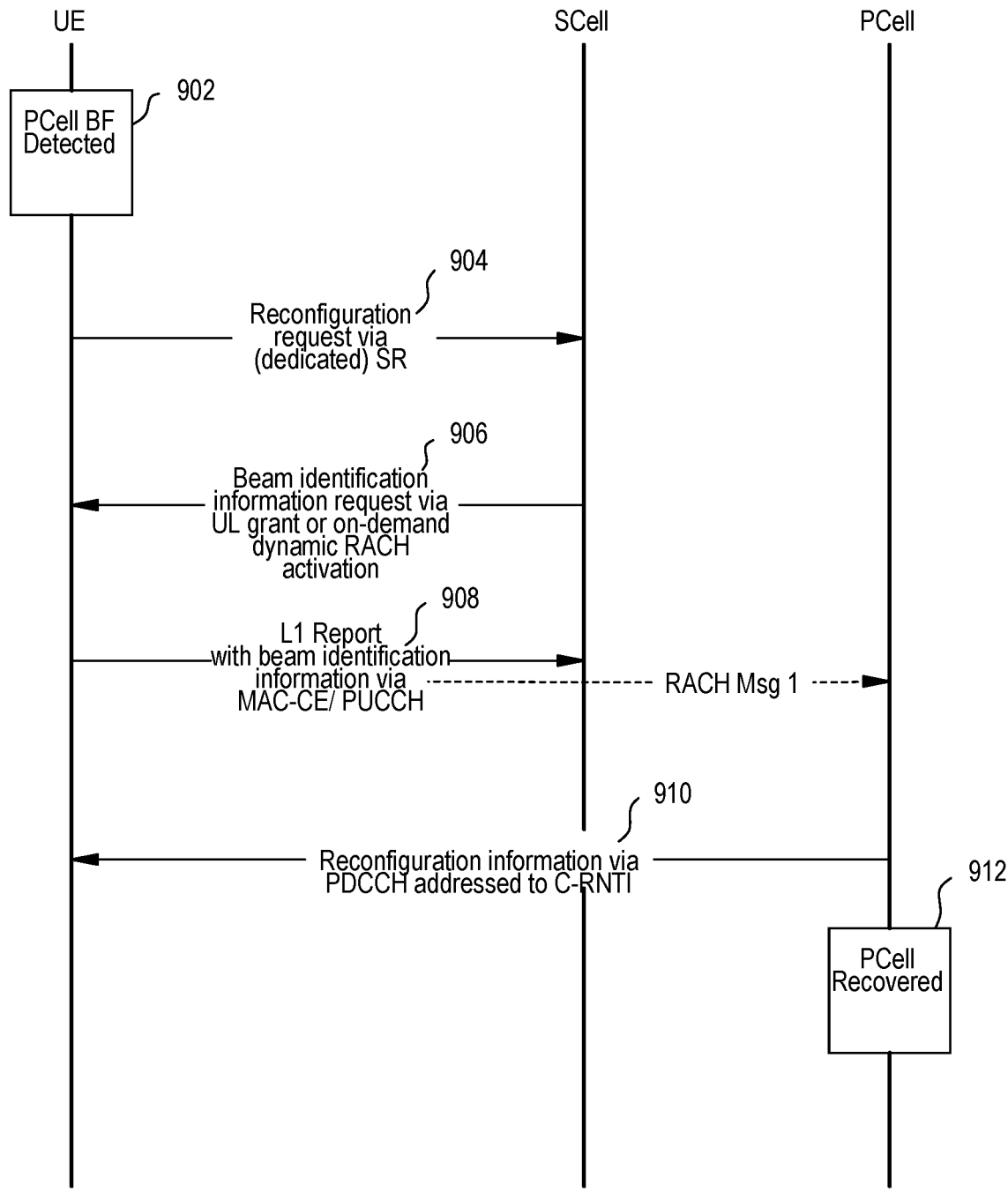
FIG. 9 shows an example call flow diagram of a link recovery procedure, in accordance with certain aspects of the present disclosure.

FIG. 9 shows an example call flow diagram illustrating this example link recovery procedure with respect to a PCell, according to certain aspects of the present disclosure. It should be noted, however, that a similar procedure may be performed if a beam failure occurs on a PSCell.

As noted above, the UE may be configured to communicate using one or more transmission beams with a wireless network via a primary cell (PCell) serving the UE, a primary secondary cell (PSCell) serving the UE, and one or more additional secondary cells (SCells) serving the UE.

In some cases, at 902, the UE may detect a layer one (L1) event, such as a beam failure (BF), associated with a first set of beams (e.g., q0 in FIG. 6) corresponding to at least one of a the PCell or PSCell. In addition to a beam failure, an L1 even may also include, for example, a beam not currently being used by the UE for communication with the PCell or the PSCell becoming better (e.g., signal strength/quality) than a current beam used for communication with the PCell or the PSCell, or some subset of a monitored set of beams becoming poor (e.g., with respect to signal strength/quality), etc.

According to aspects, a beam failure may occur, for example, when a set of beams associated with the PCell and/or PSCell meet certain criteria, such as a reference signal measurement of the set of beams associated with the PCell and/or PSCell falls below a threshold. For example, in some cases, the UE may detect a beam failure associated with at least one of the PCell or PSCell when a reference signal receive power (RSRP) of the set of beams fails to satisfy (e.g., falls below) a first threshold, a signal-to-interference-plus-noise ratio (SINR) of the set of beams fails to satisfy a second threshold, or a signal to noise ratio (SNR) of the set of beams fails to satisfy a third threshold, etc.

According to aspects, if the UE (e.g., a lower level of the UE, such as L1) detects that the set of beams meet the certain criteria for a period of time, an L1 event may occur whereby the layer L1 issues a beam failure indication to higher layers of the UE. In response to detecting the L1 event, the UE may trigger a beam recovery procedure for at least one of the PCell or the PSCell. In some cases, as noted above, the UE may use the additional SCell to assist with beam recovery. For example, in some cases, triggering the beam recovery procedure may include transmitting, at 904, an uplink signal, including a reconfiguration request, via the additional SCell (e.g., to a gNB of the SCell) to reconfigure at least one beam (such as a candidate beam) for at least one of the PCell or the PSCell. According to aspects, the reconfiguration request may indicate to the gNB of the SCell that an L1 event has occurred (e.g., a beam failure has occurred in the PCell and/or PSCell) and to reconfigure the at least one beam. In some cases, the reconfiguration request may be transmitted via the additional SCell in a dedicated scheduling request. In some cases, the reconfiguration request may be transmitted via the additional SCell in a physical uplink control channel (PUCCH) group different from a PUCCH group associated with the beam failure.

According to aspects, in response to transmitting the reconfiguration request at 904, the UE may receive at 906 request information via the additional SCell requesting identification information of the at least one beam to reconfigure (e.g., a preferred beam of the UE).

According to aspects, it should be noted that, if the gNB of the additional SCell does not receive the reconfiguration request, the UE may repeat transmission of the reconfiguration request a threshold number of times. In some cases, the UE may determine if the gNB of the additional SCell did not receive the reconfiguration request if the UE does not receive a response from the gNB within a predefined time. According to aspects, in some cases, if the UE repeats transmission of the reconfiguration request a maximum number of times (e.g., the threshold number of times) and does not receive a response from the gNB of the additional SCell, the UE may either declare an RLF or perform a RACH procedure according to Release 15 to reestablish the PCell or PSCell.

According to aspects, in response to receiving the request information via the additional SCell, the UE may transmit, at 908, the requested identification information of the at least one beam via the additional SCell in an L1 report. In some cases, the UE may determine the at least one beam based on monitoring a second set of beams (e.g., such as set q1, illustrated in FIG. 6). For example, in some cases, the UE may monitor the second set of beams and determine a suitable candidate beam (e.g., one with reference signal measurements above a threshold) for at least one of the PCell or PSCell. According to aspects, once the UE determines a suitable candidate beam, the UE may transmit the identification information of that candidate beam (e.g., the at least one beam) via the additional SCell to allow the additional SCell to facilitate reconfiguration of the PCell and/or the PSCell.

In some cases, the request information at 906 may be transmitted by the gNB of the additional SCell in an uplink grant received by the UE. According to aspects, in some cases, when an UL control channel (e.g., PUCCH) is not grouped then the UE may transmit, at 908, the requested identification information in at least one of a MAC-CE in a physical uplink sharked channel (PUSCH) of the additional SCell on receiving UL grant or on the SCell PUCCH. However, when the UL control channel is grouped (e.g., as in CA), a dedicated/temporary PUCCH of the additional SCell may be used for sending the special SR (e.g., the reconfiguration request at 902) as well as for sending the requested identification information (e.g., PUCCH/L1 report) at 908.

In some cases, the request information transmitted by the gNB of the additional SCell at 906 may include an indication of radio access channel (RACH) resources for an on-demand, reduced periodicity RACH occasion. In such a case, instead of transmitting the requested identification information to the gNB of the additional SCell, the UE may instead indicate, at 908, the requested identification information of the at least one beam by transmitting a RACH message on the RACH of the at least one beam using the indicated RACH resources. According to aspects, the indicated RACH resources may be contention free and occur more frequently, allowing the UE to more quickly perform the RACH sequence as compared to the RACH sequence defined in Release 15.

According to aspects, in response to transmitting the requested identification information at 908, the UE may monitor for and receive, at 910, reconfiguration information for the at least one beam. In some cases, the reconfiguration information may be received in downlink control information format with CRC scrambled with a cell radio network temporary identifier (C-RNTI) associated with the UE on a physical downlink control channel (PDCCH). In some cases, the reconfiguration information may be transmitted on a PDCCH in a recovery search space provided by a higher layer parameter recoverySearchSpaceId. According to aspects, if the UE detects a DCI format with CRC scrambled by C-RNTI or modulation and coding scheme (MCS)-C-RNTI in the search space set provided by recoverySearchSpaceId, the UE may continue to monitor PDCCH candidates in the search space set provided by recoverySearchSpaceId until the UE receives a MAC CE activation command for a TCI state of the UE or higher layer parameters TCI-StatesPDCCH-ToAddlist and/or TCI-StatesPDCCH-ToReleaseList.

At 912, the PCell (and/or PSCell) may be recovered once the UE receives the MAC CE activation command corresponding to the at least one beam. The UE may then communicate, based on the reconfiguration information, with at least one of the (recovered) PCell or the PSCell using the at least one beam.

Figure 10:
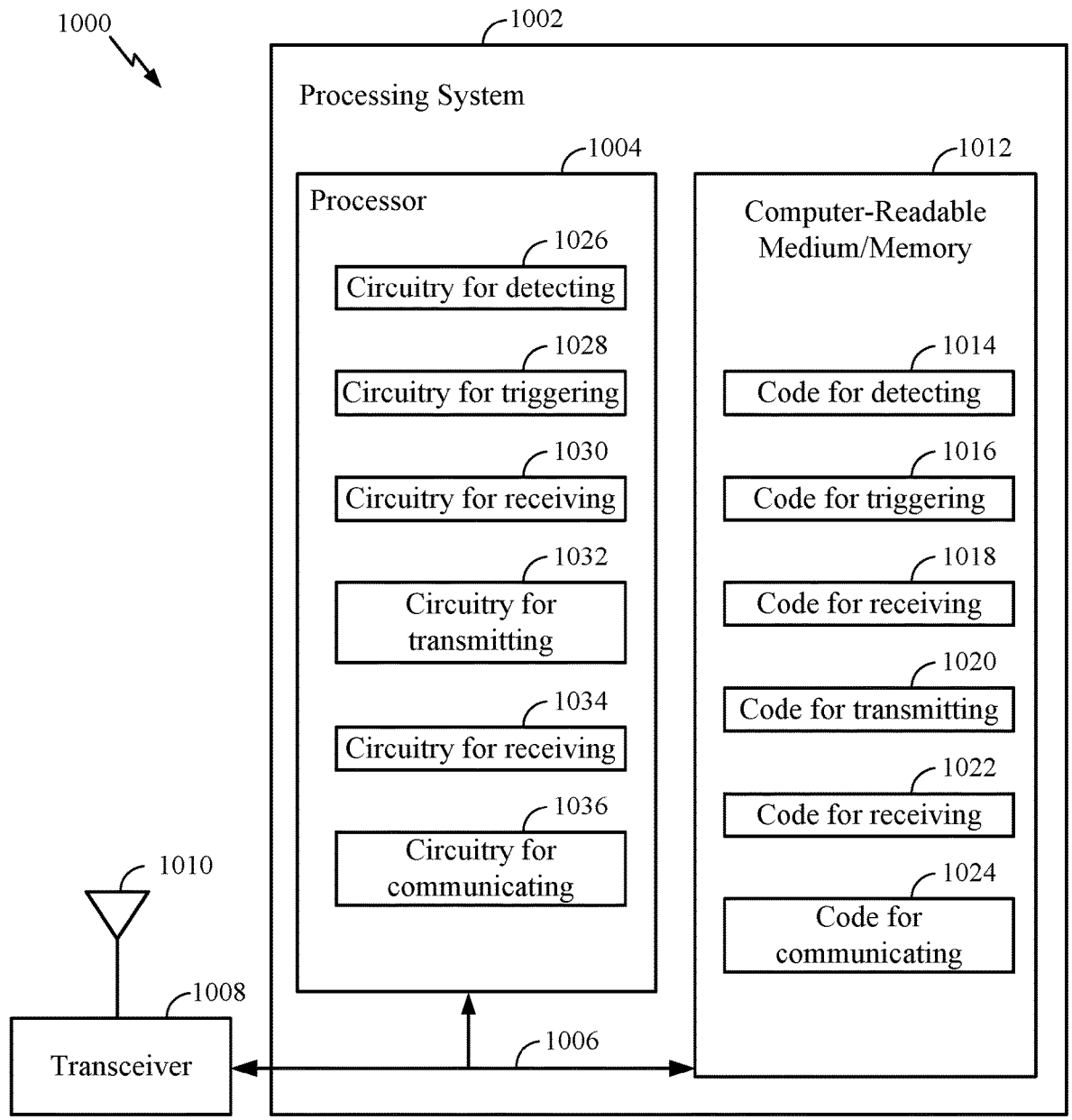
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein for link recovery procedures, such as the operations illustrated in FIGS. 6, 9, and 9. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 6, 7, or 9, or other operations for performing the various techniques discussed herein for link recovery procedures. In certain aspects, computer-readable medium/memory 1012 stores code for performing the operations illustrated in one or more of FIGS. 6, 7, and 9. For example, computer-readable medium/memory 1012 stores code 1014 for detecting a layer one (L1) event associated with at least one of a primary cell (PCell) serving the UE or a primary secondary cell (PSCell) serving the UE, code 1016 for triggering, in response to detecting the L1 event, a beam recovery procedure for at least one of the PCell or the PSCell, wherein triggering the beam recovery procedure includes transmitting a reconfiguration request via an additional secondary cell (SCell) to reconfigure at least one beam for at least one of the PCell or the PSCell, code 1018 for receiving request information via the additional SCell requesting identification information of the at least one beam to reconfigure, code 1020 for transmitting the requested identification information of the at least one beam, code 1022 for receiving, in response to transmitting the requested identification information, reconfiguration information for the at least one beam, and code 1024 for communicating, based on the reconfiguration information, with at least one of the PCell or the PSCell using the at least one beam.

In certain aspects, the processor 1004 may include circuitry configured to implement the code stored in the computer-readable medium/memory 1012, such as for performing the operations illustrated in FIGS. 6, 7, and 9. For example, the processor 1004 includes circuitry 1026 for detecting a layer one (L1) event associated with at least one of a primary cell (PCell) serving the UE or a primary secondary cell (PSCell) serving the UE, circuitry 1028 for triggering, in response to detecting the L1 event, a beam recovery procedure for at least one of the PCell or the PSCell, wherein triggering the beam recovery procedure includes transmitting a reconfiguration request via an additional secondary cell (SCell) to reconfigure at least one beam for at least one of the PCell or the PSCell, circuitry 1030 for receiving request information via the additional SCell requesting identification information of the at least one beam to reconfigure, circuitry 1032 for transmitting the requested identification information of the at least one beam, circuitry 1034 for receiving, in response to transmitting the requested identification information, reconfiguration information for the at least one beam, and circuitry 1036 for communicating, based on the reconfiguration information, with at least one of the PCell or the PSCell using the at least one beam.

Figure 11:
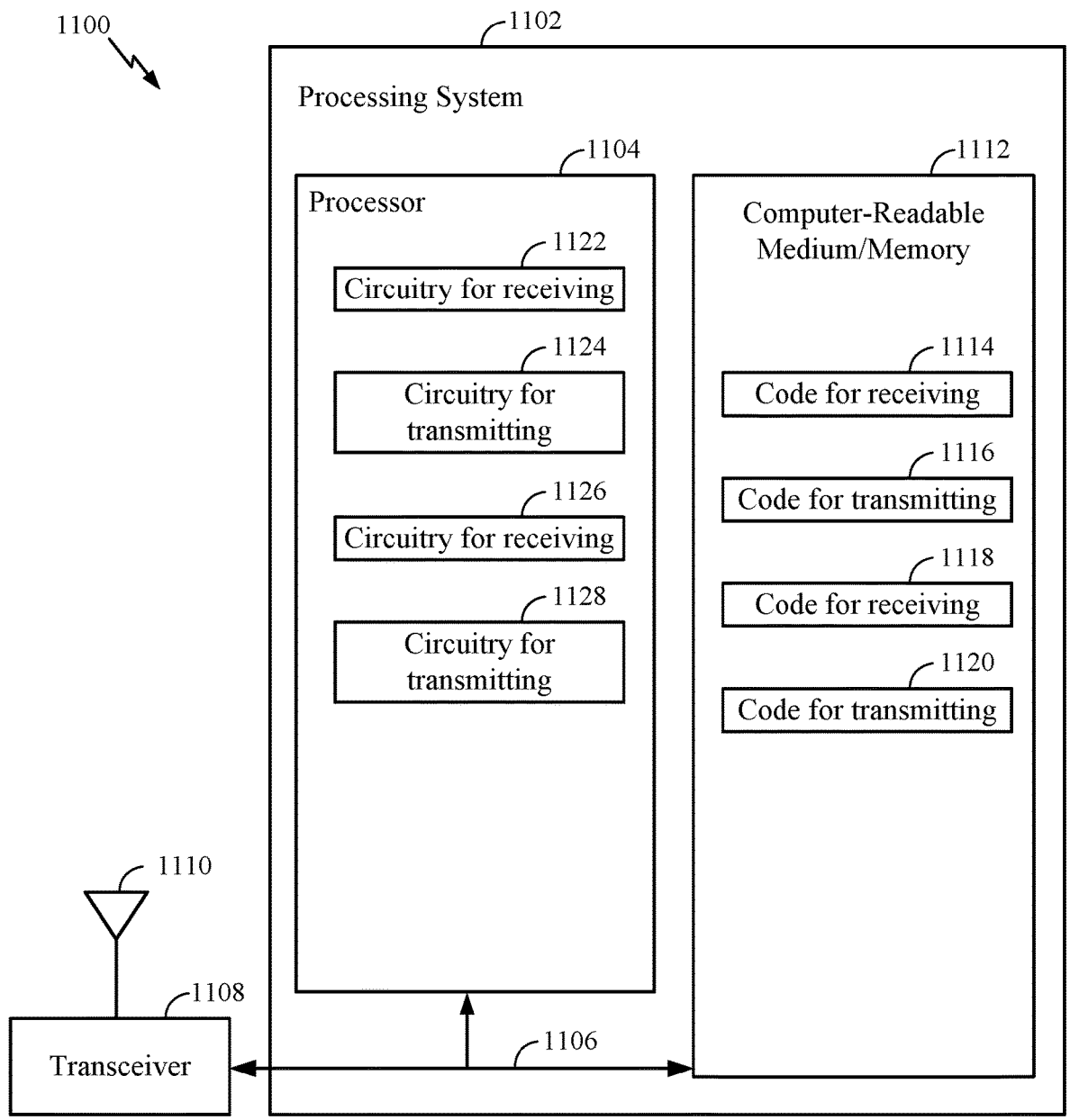
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein for link recovery procedures, such as the operations illustrated in FIGS. 6, 8, and 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 6, 8, and 9, or other operations for performing the various techniques discussed herein for link recovery procedures. In certain aspects, computer-readable medium/memory 1112 stores code for performing the operations illustrated in one or more of FIGS. 6, 8, and 9. For example, computer-readable medium/memory 1112 stores code 1114 for receiving, from a user equipment (UE) served by at least one of a primary cell (PCell) or a primary secondary cell (PSCell), a reconfiguration request to reconfigure at least one beam for at least one of the PCell or the PSCell in response to a layer one (L1) event at the UE associated with at least one of the PCell or the PSCell, wherein the reconfiguration request is received via an additional secondary cell (SCell) serving the UE, code 1116 for transmitting, to the UE, request information requesting identification information of the at least one beam to reconfigure, code 1118 for receiving, from the UE, the requested identification information of the at least one beam, and code 1120 for transmitting, in response to receiving the requested identification information, reconfiguration information for the at least one beam.

In certain aspects, the processor 1104 may include circuitry configured to implement the code stored in the computer-readable medium/memory 1112, such as for performing the operations illustrated in FIGS. 6, 8, and 9. For example, the processor 1104 includes circuitry 1122 for receiving, from a user equipment (UE) served by at least one of a primary cell (PCell) or a primary secondary cell (PSCell), a reconfiguration request to reconfigure at least one beam for at least one of the PCell or the PSCell in response to a layer one (L1) event at the UE associated with at least one of the PCell or the PSCell, wherein the reconfiguration request is received via an additional secondary cell (SCell) serving the UE, circuitry 1124 for transmitting, to the UE, request information requesting identification information of the at least one beam to reconfigure, circuitry 1126 for receiving, from the UE, the requested identification information of the at least one beam, and circuitry 1128 for transmitting, in response to receiving the requested identification information, reconfiguration information for the at least one beam.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
   detecting a layer one (L1) event associated with at least one of a primary cell (PCell) serving the UE or a primary secondary cell (PSCell) serving the UE;
   triggering, in response to detecting the L1 event, a beam recovery procedure for at least one of the PCell or the PSCell, wherein triggering the beam recovery procedure includes transmitting a reconfiguration request via an additional secondary cell (SCell) to reconfigure at least one beam for at least one of the PCell or the PSCell;
   receiving request information via the additional SCell requesting identification information of the at least one beam to reconfigure;
   transmitting the requested identification information of the at least one beam;
   receiving, in response to transmitting the requested identification information, reconfiguration information for the at least one beam; and
   communicating, based on the reconfiguration information, with at least one of the PCell or the PSCell using the at least one beam.

2. The method of claim 1, wherein:
   the L1 event comprises a beam failure associated with at least one of the PCell or the PSCell; and
   detecting the beam failure associated with at least one of the PCell or the PSCell comprises detecting that a reference signal measurement of one or more beams associated with at least one of the PCell or the PSCell falls below a threshold.

3. The method of claim 1, wherein transmitting the reconfiguration request comprises transmitting the reconfiguration request via the additional SCell in a dedicated scheduling request.

4. The method of claim 1, wherein transmitting the reconfiguration request comprises transmitting the reconfiguration request via the additional SCell using a physical uplink control channel (PUCCH) group different from a PUCCH group associated with the L1 event.

5. The method of claim 1, further comprising, repeating transmission of the reconfiguration request via the additional SCell for a threshold number of times if a response to the reconfiguration request is not received within a defined time window.

6. The method of claim 1, further comprising receiving the request information via the additional SCell in an uplink grant.

7. The method of claim 6, further comprising, based on information in the uplink grant, transmitting the requested identification information of the at least one beam via the additional SCell in at least one of:
   a media access control control element (MAC-CE) on a physical uplink shared channel (PUSCH); or
   a message on a physical uplink control channel (PUCCH) of the additional SCell.

8. The method of claim 1, wherein the request information includes an indication of radio access channel (RACH) resources for an on-demand RACH.

9. The method of claim 1, wherein transmitting the requested identification information comprising transmitting a RACH message on the RACH of the at least one beam using the indicated RACH resources.

10. The method of claim 1, wherein the reconfiguration information is received in downlink control information scrambled with a cell radio network temporary identifier (C-RNTI) associated with the UE on a physical downlink control channel (PDCCH) of at least one of the PCell or the PSCell.

11. A method of wireless communication by a base station, comprising:
    receiving, from a user equipment (UE) served by at least one of a primary cell (PCell) or a primary secondary cell (PSCell), a reconfiguration request to reconfigure at least one beam for at least one of the PCell or the PSCell in response to a layer one (L1) event at the UE associated with at least one of the PCell or the PSCell, wherein the reconfiguration request is received via an additional secondary cell (SCell) serving the UE;

transmitting, to the UE, request information requesting identification information of the at least one beam to reconfigure;

receiving, from the UE, the requested identification information of the at least one beam; and transmitting, in response to receiving the requested identification information, reconfiguration information for the at least one beam.

12. The method of claim 11, wherein receiving the reconfiguration request comprises receiving the reconfiguration request in a dedicated scheduling request.

13. The method of claim 11, wherein receiving the reconfiguration request comprises receiving the reconfiguration request using a physical uplink control channel (PUCCH) group different from a PUCCH group associated with the L1 event.

14. The method of claim 11, further comprising transmitting the request information in an uplink grant.

15. The method of claim 14, further comprising, based on information in the uplink grant, receiving the requested identification information of the at least one beam in at least one of:
a media access control control element (MAC-CE) on a physical uplink shared channel (PUSCH); or
a message on a physical uplink control channel (PUCCH) of the SCell.

16. The method of claim 11, wherein the request information includes an indication of radio access channel (RACH) resources for an on-demand RACH of least one of the PCell or the PSCell.

17. The method of claim 16, wherein receiving the requested identification information comprises receiving, based on the indicated RACH resources, the requested identification information in a RACH message on the on-demand RACH of at least one of the PCell or the PScell.

18. The method of claim 17, wherein transmitting the reconfiguration information comprises transmitting downlink control information scrambled with a cell radio network temporary identifier (C-RNTI) on a physical downlink control channel (PDCCH) via at least one of the PCell or the PSCell.

19. An apparatus for wireless communication by a user equipment (UE), comprising:
at least one processor configured to:
detect a layer one (L1) event associated with at least one of a primary cell (PCell) serving the UE or a primary secondary cell (PSCell) serving the UE;
trigger, in response to detecting the L1 event, a beam recovery procedure for at least one of the PCell or the PSCell, wherein triggering the beam recovery procedure includes transmitting a reconfiguration request via an additional secondary cell (SCell) to reconfigure at least one beam for at least one of the PCell or the PSCell;
receive request information via the additional SCell requesting identification information of the at least one beam to reconfigure;
transmit the requested identification information of the at least one beam;
receive, in response to transmitting the requested identification information, reconfiguration information for the at least one beam; and
communicate, based on the reconfiguration information, with at least one of the PCell or the PSCell using the at least one beam; and
a memory coupled with the at least one processor.

20. The apparatus of claim 19, wherein:
the L1 event comprises a beam failure associated with at least one of the PCell or the PSCell; and
the at least one processor is configured to detect the beam failure associated with at least one of the PCell or the PSCell by detecting that a reference signal measurement of one or more beams associated with at least one of the PCell or the PSCell falls below a threshold.

21. The apparatus of claim 19, wherein the at least one processor is configured to transmit the reconfiguration request by transmitting the reconfiguration request via the additional SCell in a dedicated scheduling request.

22. The apparatus of claim 19, wherein the at least one processor is configured to transmit the reconfiguration request by transmitting the reconfiguration request via the additional SCell using a physical uplink control channel (PUCCH) group different from a PUCCH group associated with the L1 event.

23. The apparatus of claim 19, wherein the at least one processor is further configured to repeat transmission of the reconfiguration request via the additional SCell for a threshold number of times if a response to the reconfiguration request is not received within a defined time window.

24. The apparatus of claim 19, wherein the at least one processor is further configured to:
receive the request information via the additional SCell in an uplink grant;
transmit, based on information in the uplink grant, the requested identification information of the at least one beam via the additional SCell in at least one of:
a media access control control element (MAC-CE) on a physical uplink shared channel (PUSCH); or
a message on a physical uplink control channel (PUCCH) of the additional SCell.

25. An apparatus for wireless communication by a base station of an secondary cell, comprising:
at least one processor configured to:
receive, from a user equipment (UE) served by at least one of a primary cell (PCell) and or a primary secondary cell (PSCell), a reconfiguration request to reconfigure at least one beam for at least one of the PCell or the PSCell in response to a layer one (L1) event at the UE associated with at least one of the PCell or the PSCell, wherein the reconfiguration request is received via an additional secondary cell (SCell) serving the UE;
transmit, to the UE, request information requesting identification information of the at least one beam to reconfigure;
receive, from the UE, the requested identification information of the at least one beam; and
transmit, in response to receiving the requested identification information, reconfiguration information for the at least one beam; and
a memory coupled with the at least one processor.

26. The apparatus of claim 25, wherein receiving the reconfiguration request comprises receiving the reconfiguration request in a dedicated scheduling request.

27. The apparatus of claim 25, wherein receiving the reconfiguration request comprises receiving the reconfiguration request using a physical uplink control channel (PUCCH) group different from a PUCCH group associated with the L1 event.

28. The apparatus of claim 25, further comprising transmitting the request information in an uplink grant.

29. The apparatus of claim 28, further comprising, based on information in the uplink grant, receiving the requested identification information of the at least one beam in at least one of:
- a media access control control element (MAC-CE) on a physical uplink shared channel (PUSCH); or
- a message on a physical uplink control channel (PUCCH) of the SCell.

30. The apparatus of claim 25, wherein:
- the request information includes an indication of radio access channel (RACH) resources for an on-demand RACH of least one of the PCell or the PSCell;
- receiving the requested identification information comprises receiving, based on the indicated RACH resources, the requested identification information in a RACH message on the on-demand RACH of at least one of the PCell or the PScell; and
- transmitting the reconfiguration information comprises transmitting downlink control information scrambled with a cell radio network temporary identifier (C-RNTI) on a physical downlink control channel (PDCCH) via at least one of the PCell or the PSCell.

* * * * *